United States Patent [19]
Letvin

[11] 3,803,846
[45] Apr. 16, 1974

[54] WASTE HEAT RECOVERY PROCESS

[76] Inventor: Samuel Letvin, 112 Shelbourne Dr., York, Pa. 17403

[22] Filed: June 14, 1971

[21] Appl. No.: 152,705

[52] U.S. Cl. .................................... 60/685, 60/106
[51] Int. Cl. ..................... F01k 19/10, F28f 27/02
[58] Field of Search ......... 60/67, 105, 107, 64, 106, 60/73; 122/40, 489, 406 R

[56] References Cited
UNITED STATES PATENTS
1,750,035  3/1930  Brown .................................. 60/67
2,707,239  4/1955  Riehl ..................................... 60/67
3,304,716  2/1967  Griffin ................................. 60/105
3,338,055  8/1967  Gorzegno ............................ 60/107

Primary Examiner—Edgar W. Geoghegan
Assistant Examiner—H. Burks, Sr.

[57] ABSTRACT

A process is described for the recovery of waste heat by means of a novel combination of fluid and steaming economizer units and a modified flash steam vapor generator deaerator whereby more efficient and controlled extraction of heat from low temperature gases is affected.

10 Claims, 1 Drawing Figure

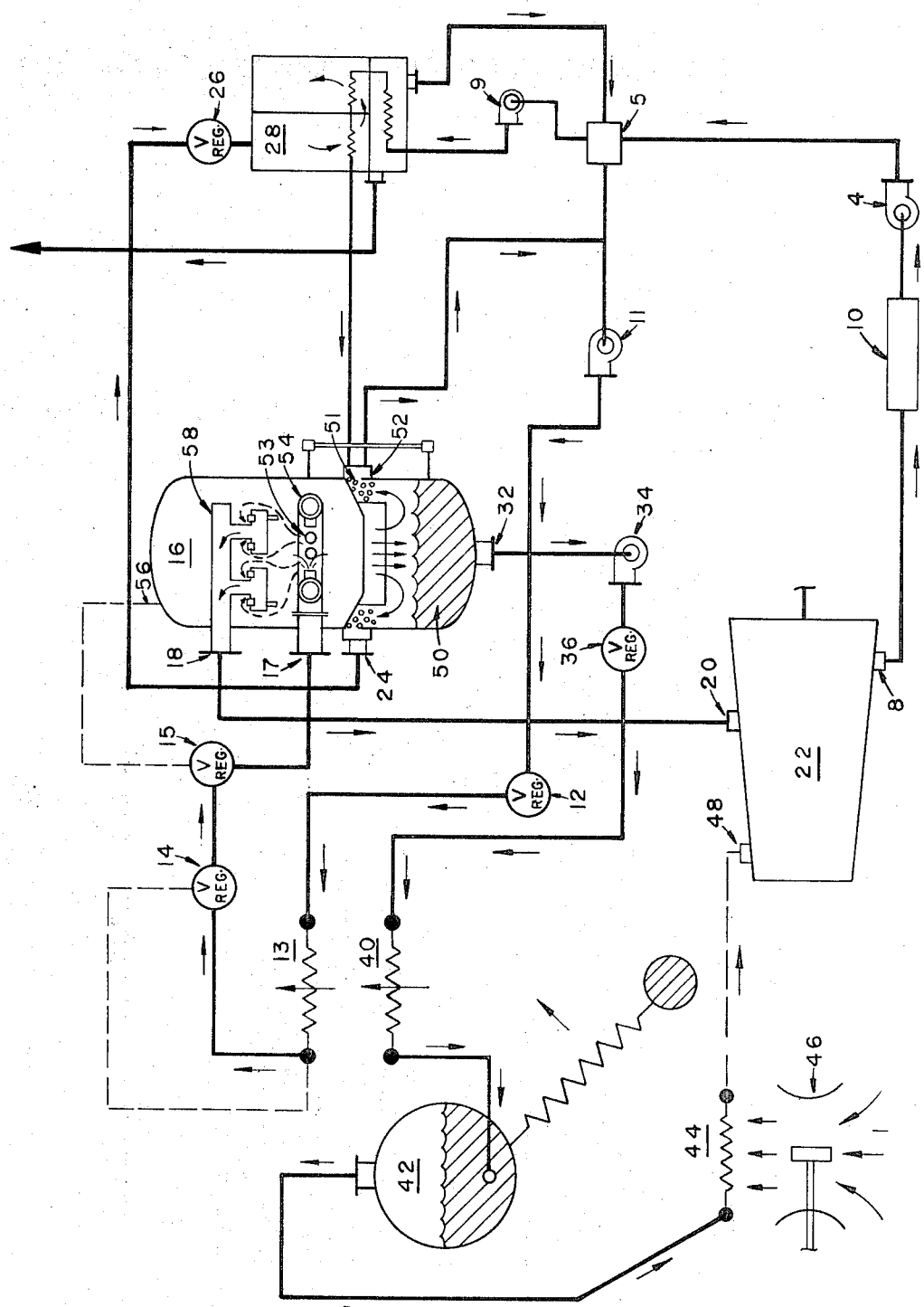
PATENTED APR 16 1974
3,803,846
INVENTOR.
SAMUEL LETVIN
BY J Wm Berkstresser
ATTORNEY

WASTE HEAT RECOVERY PROCESS

The present invention is concerned with waste heat recovery and more particularly with the efficient recovery of heat from large masses of low temperature gases resulting from gas turbine application, large reciprocating engine exhaust, waste process heat and the like.

Conventional waste heat recovery has been achieved by the use of economizers having adequate surface areas for gas and fluid heat exchange contact. Such economizers are effective when the weight ratio of gases to heat exchange fluid is low and there is an adequate mean temperature difference between them. As this mean temperature difference decreases the efficiency is adversely effected.

The temperature of the gases entering a conventional economizer is of the order of 700° to 900° F, then the temperature at the exit of the economizer will be about 350° to 400° F.

If the temperatures of the exit gases in conventional systems were the order of about 250° to 300° F then corrosive deposits would condense onto the heat exchanging surfaces of the gas side of the economizer where corrosive condensables are present in the gas stream thereby shortening the useful life of the economizer as well as reducing its heat exchanging efficiency. Conventionally it is also typical for the water or other heat exchange fluid entering the economizer to have undergone deaeration in a conventional deaerator which normally raises the temperature of the feed water from about 120° F the hot well temperature, to about 250° F delivered to the economizer. This type of arrangement has very definite limitations which the present invention seeks to overcome.

It is therefore, an object of the present invention to increase the efficiency of heat recovery from relatively low temperature gases.

It is a further object of the present invention to reduce the heat exchanging surface area of the economizer surface in the recovery of waste heat.

It is a further object of the present invention to incorporate with the economizer system a flashing vapor generator which also acts as the system's deaertor.

Other objects and advantages arising from the novel waste heat recovery system of the present invention will be apparent from the herein after description of the operation of the waste heat recovery process of this invention.

The hereinbefore advantages desired and others are typically obtained by the employment of a waste heat recovery system which utilizes feed water in a low temperature economizer in heat exchanging contact with waste heat containing exhaust gases where the water from the economizer is deaerated under pressure while low pressure steam is recovered and deaerated feed is then cycled through a higher temperature economizer and into a high pressure boiler where the recovered heat is than assisting in the primary work of the vapor generator, i.e., the production of high pressure steam.

Referring to the drawing:

The FIGURE is a schematic flow diagram of the heat recovery processes of the present invention.

Referring now to the drawing in detail Turbine 22 represents the primary source of power with vapor exhausted through Outlet 8 and transferred by conduit to Condenser 10. Pump 11 is the primary feed pump which supplies deaerator Vessel 16 through Valve 12. Primary Economizer 13, and through Pressure Regulating Valves 14 and 15 into Deaerator Inlet 17. The effluent from the Condenser 10 is pumped by Pump 4 to Tank 5 and by Pumps 9 and Pump 11 to Air Ejector 28 and Deaerator Vessel 16 respectively. The Deaerator 16 is equpped with a Nozzle Manifold 54 fed from Inlet 17, a Reservoir 50, Steam Collectors 58, Steam Outlet 18, Pressure Sensing Loop Outlet 56, Vent Condenser Outlet 52, Main Vent Condenser 51 and Venting Manifold Outlet 24.

The feed from Primary Economizer 13 is introduced into the Deaerator Vessel 16 through Inlet 17 and into the Deaerator Reservoir 50 by means of the Nozzles 53 in Manifold 54. Pressure on the deaerator is maintained by Valve 15 which is operated in response to a pressure sensing loop formed by conduit from pressure sensing loop outlet 56 to Valve 15 and the feed from Primary Economizer 13 to Valve 15 is regulated by Valve 14 which maintains back pressure on Economizer 13. The steam formed in Deaerator 16 is supplied to the low pressure Inlet 20 of Turbine 22 by means of conduit connected to the Outlet 18 from the Steam Collectors 58 in the Deaerator Vessel 16. Liquid is collected in the Deaerator Vessel 16 in the Reservoir 50 and added to the feed fluid ahead of Pump 34 by means of a conduit connected to Deaerator Outlet 32. Similarly the entrained air in Deaerator Vessel 16 is exhausted at Outlet 24 to Air Ejector 28 through regulating Valve 26.

During the operation of the dual economizer heat recovery system of the present invention condensed water from Condensor 10 is pumped by Pump 11 from Tank 5 in quantities required by Control Valve 12 in response to changes in the liquid level in Reservoir 50. Pump 11 and Valve 12 thereby regulate the amount of water passing through Primary Economizer 13 to maintain the required level in Reservoir 50. In addition the outlet pressure of the Primary Economizer 13 is held constant to a predetermined value by Control Valve 14 in response to a sensing loop. The predetermined pressure established by the control of Valve 14 will normally be at a value which provides a saturation steam temperature which is below the temperature of the gases entering the Primary Economizer 13 and compatible to design requirements. It is generally desirable to maintain a saturation temperature below the temperature of the gases entering the Primary Economizer 13 so as to effect appreciable steam formation at the outlet of Economizer 13. By establishing these predetermined values the heat from the gases entering the economizer is absorbed as both sensible heat and heat of vaporization with the latter being greater than the former.

The steam and water mixture leaving the Primary Economizer 13 is controlled by Valve 14 so as to maintain a proper back pressure, it then passes through regulating Valve 15 which maintains the working pressure in the Flash Steam Generator Deaerator Vessel 16 at a level suitable for the injection of steam into the lower pressure stage of Steam Turbine 22. This is shown by the conduit connecting Steam Outlet 18 of Flash Steam Vapor Generator Deaerator Vessel 16 to low pressure Inlet 20 of Turbine 22. By design, the Flash Steam Generator Deaerator Vessel 16 is equipped to affect dry steam from its Outlet 18 by means of the Steam Purifying Collectors 58 within the Vessel 16. Simultaneously, Vessel 16 functions as a conventional deaerator while under the predetermined pressure, by removing the trapped air from the steam as is shown at Outlet 24 which connects with the conventional Air Ejector 28 through Pressure Regulating Valve 26. The condensate from Air Ejector 28 is returned to the tank or otherwise discharged into the feed water system and the entrained air is discharged to the atmosphere.

As mentioned hereinbefore, the Deaerator Vessel 16 contains a Reservoir 50 of hot deaerated water. During operation of the system the hot water in the Reservoir 50 will be maintained at saturation temperature corresponding to the pressure being maintained within the Deaerator Vessel. This hot water is drawn from Reservoir 50 by means of Pump 34 where it proceeds through Secondary Economizer 40. On its course through Secondary Economizer 40 the temperature of this water is raised to its final temperature by the gases leaving conventionally, a main boiler saturation tube bank, shown schematically as an extended portion of Boiler 42. After exiting secondary economizer 40, the water is then discharged into a main steam drum of the Boiler 42. The high pressure steam coming from Boiler 42 is used in the conventional manner as shown here. By being introduced into the high pressure state of Turbine 22. Additionally, Superheater 44 is provided in the line between Boiler 42 and the high pressure inlet 48 of Steam Turbine 22.

Where desired, the waste heat recovery system of the present invention can incorporate anti-pollution devices to great advantage. For example, where the sources of heat energy for the main Boiler 42, is obtained from the burning of hydocarbon fuels such as coal, oil and the like, afterburners of know design may be inserted as shown schematically at 46 in the exhaust to the waste heat recovery unit. In this manner where the gases contain carbon monoxide, unburned hydocarbons and the like, the use of an Afterburner 46 can thus also effect a higher temperature in the gas stream used for the Superheater 44, the Boiler 42 and the Secondary and Primary Economizers 40 and 13 respectively. Such an afterburner may operate by the air injection and/or the burning of supplemental fuel to provide the complete combustion of the original exhaust gases. Such an addition can be employed effectively with the process of this invention because of the higher energy output possible from the Heat Exchangers 42, 40 and 13 as the temperature of the gas is raised. Since our invention provides a practical, economical means of retrieving efficiently energy from large masses of low temperature gases it is very effective in reducing heat pollution. In this manner the process of the present invention provides a dual benefit in that the pollution normally encountered from the inefficient burning of the hydrocarbon fuels can be substantially reduced and the reduction of the so-called heat pollution is effected by more efficient extraction of the heat energy used in the operation of a steam turbine.

Further advantages can be appreciated by a comparison between the present waste heat recovery system and conventional systems. Conventionally, boilers used in combination with economizers and particularly economizers which are required to handle large volumes of gases at low temperatures, such as in waste heat recovery units, the effectiveness of the economizer was severely limited prior to this invention because the increase of the outlet temperature of the water leaving the economizer quickly approached the temperature of the entering gases. When this condition occurred the temperature difference between the gases and the water leaving the economizer was small thereby preventing the recovery of a large quantity of heat energy contained in the gas. This condition prevents achieving the desired result primarily because of the heat available from the gases at low temperature was so great in comparison to the heat that the steam generating water in the system could absorb that optimum recovery was impossible. For example, a normal boiler feed water temperature would be in the range of from between 240° to about 250° F. This temperature was generally established by the exit temperature of the deaerator used in the system. This condition would obtain even though the water from the hot well could be anywhere from between about 110° F to about 125° F. Unfortunately, the water from the hot well could not normally be put into the boiler without deaeration because of the likelihood of oxygen attack to the inner portions of the boiler to which the non deaerator water would be placed in contact. Thus deaeration would raise the temperature of the water to the 240° to 250° F value. Avoidance of this problem has been accomplished in the art with large masses of low temperature gases by the serial use of high pressure and low pressure boilers, with the low pressure boiler steam being used in a conventional deaeration and the excess steam power on process application. This approach of necessity requires more space and equipment.

Contrary to the problems presented by the use of conventional systems, the waste heat recovery system of the present invention is able to recover greater quantities of heat from the low temperature gases with less equipment that has hitherto been possible. This improvement is basically and simply accomplished by the employment of a pressure control means for control of the pressure within the Deaerator and Primary Economizer such will become apparent hereinafter.

Continuing to follow the operation of the system of the present invention the water steam mixture coming from the Primary Economizer 13 contains a small quantity of entrained air and is therefore discharged into the Flash Steam Generator Deaerator 16 by means of the Nozzles 53 on Manifold 54. The Flash Steam Generator Deaerator 16 acts at this point as a separator by permitting the steam to enter through Nozzles 53 and then pass out of the Deaerator 16 through the Collectors 58 and Outlet 18 to be later introduced to the low pressure nozzles on Turbine 22 through Inlet 20. The Turbine 22 is shown here simply as a receiver of the low pressure steam. In a conventional use, such low pressure steam can be employed whether it be turbine application chemical process or the like. Additional, steam is of course generated by the flashing of higher pressure primary water in the lower pressure Flashing Steam Generator Deaerator zone.

In the Deaerator 16 the water from the Nozzle 53 not flashing into steam upon entrance into the Deaerator 16 falls into the Reservoir Section 50. At this point the entrained air in the water has an opportunity to be collected under the apron shown connecting Inlet 24 and Outlet 52. The design of such a collector is conventional in the art and many expediants may be employed successfully for the collection of the air which had been entrained in the water stream and is then removed by the separation of steam and water within the deaerator. The collector adjacent outlet 52 may additionally be equipped with Condenser coils if the desire is to condense certain of the steam so that only satuated air will enter the venting manifold through Outlet 24 and Valve 26 into Air Ejector 28 and eventual discharge into the atmosphere (shown schematically by the arrow at the bottom of Ejector 28).

The combination of the operation of the Flash Steam Generator-Deaerator 16 with the Primary Economizer 13 as hereinbefore described has the distinct advantage of combining three important functions in a two unit system. These functions can best be described as follows: (1) Removal of the entrained gases from the feed water before the feed water enters the higher temperature high pressure main boiler Vessel 42 will reduce the probability of destructive attack on the internal compotents of the Main Boiler 42 and (2) The deaerator likewise functions to produce substantial quantities of low pressure steam which can be applied to process work or turbines and the like. Finally, the combination provides a method of extracting appreciably more heat from the boiler gases than has hitherto been possible by employing conventional economizer or serial high-low pressure boilers methods.

For example, where large volumes of relatively low temperature gases are employed conventional economizers had to be made with considerably larger surface area in order to be even capable of beginning handling the heat exchange. If the temperatures involved were sufficiently low that sulphuric acid could condense, or for that matter any other condensable corrosive components in the gas stream, the designer was faced with the problem of producing a very large surface area economizer out of the most expensive materials. This was necessary in order to reduce the rate of depreciation of such economizer or breakdown due to corrosion from the exit gases. In the process of the present invention the Primary Economizer 13 can be of relative minor size or modest size in relation to the conventional type of exchange as the low hot well temperature water from the Tank 5 can be introduced directly into the inlet of Primary Economizer 13 providing highest possible mean temperature difference. This means that such an economizer can be constructed of the most corrosion resistant materials available without being prohibitively expensive. Such construction would then enable this economizer to work at much lower temperatures than had hitherto been practically possible and still successfully resist corrosion. As stated hereinbefore, operating at these lower temperatures is a significant advantage in being able to extract the large amounts of heat which is present in these low temperature high volume waste heat applications. Very generally, the use of the better quality stainless steels in the primary economizer will also provide the best resistance to oxygen attack from the water side of the economizer.

It should be obvious from the foregoing that a great advantage is obtained in the present invention by localizing the equipment which will require the greatest corrosion resistance thereby enabling the designer to make more economical use of materials throughout the remainder of the components of the system. This latter fact permits the realization of very significant economies in the construction of new systems while also achieving greater utilization of the heat energy available and reducing the thermal and particulate pollution potential of the system while drastically reducing the exit temperature of the gases.

The following example is used to illustrate the principal of operation of the waste heat recovery system of the present invention. The values selected are typical for a particular application and obviously the arrangement and the quantity of the heating surfaces, the gas flow, gas pressure losses, water-steam pressure losses, inlet gas temperatures to the system, pressure maintained at the discharge of the Primary Economizer and in the Flashing Steam Generator Deaerator, and the like can be varied at the discretion of the designer to effect his desired results.

The overall efficiency of the steam or vapor generator is a direct function of the temperature that the exhaust gases have when they leave the dual economizer. Therefore, the saturation temperature that the designer selects for the discharge condition of the primary economizer water-vapor outlet is determined as a function of the exhaust gas temperature and pressure where conditions are as hereinbefore described.

The lower the temperature at the Primary Economizer gas outlet the greater will be the mean temperature difference across the primary economizer and generally the greater will be the heat absorption of the economizer.

It must be kept in mind that the foregoing discussion must be related to the overall efficiency of plant design. The selection in practice of the pressures and temperatures in which the dual economizers are to function are selected generally in relation to the effect that it will have on the pressure of the vapor or steam used in the plant. That is, whether the steam is to be used at a high pressure or low pressure inlet of the turbine or is to be used for process energy or the like. Where a turbine is to be the prime mover generally the efficiency of the turbine increases in proportion to the increase in pressure and temperature of the steam. An increase in the pressure and temperature of the steam would lower the overall vapor generator efficiency. In view of this the designer must select the pressure and temperature at the outlet or discharge of the primary economizer which will provide the maximum effectiveness for the entire plant system considering the primary function to be served.

A Heat Absorption Determination typical of the invention is shown below in Tables I and II.

TABLE I

| | | |
|---|---|---|
| (a) | Pounds of Steam/Hr generated Main High Pressure Steam Generator | 28,100 lbs./hr. |
| (b) | Pounds of Gases through Dual Economizer | 320,000 lbs./hr |
| (c) | Main High Pressure Boiler Pressure | 650 PSIA |
| (d) | Feed Water Temperature from Hot Well | 120° F |
| (e) | Temp Water from Secondary Economizer | 410° F |
| (f) | Temp Water and Steam from Primary Economizer at 200 PSIA | 381.8°F |
| (g) | Pressure at Primary Economizer Outlet | 200 PSIA |
| (h) | Temp Gases Primary Economizer Inlet | 470°F |
| (i) | Temp Gases Primary Economizer Outlet | 310°F |
| (j) | Heat of Liquid at 120°F | 87.9 BTU/lb |
| (l) | Heat Liquid at 200 PSIA and 381.8°F | 355.4 BTU/lb |
| (m) | Heat Vaporization 200 psia | 843 BTU/lb |
| (n) | Saturation Temp 200 psia | 381.8°F |
| (o) | Heat of Liquid at 80 psia Low Pressure Steam Flashing Deaerator | 282 BTU/lb |
| (p) | Heat of Vaporiation at 80 psia Low Pressure Steam Flashing Deaerator | 901.1 BTU/lb |
| (q) | Saturation Temp at 80 psia Low Pressure Steam Flashing Deaerator | 312.0°F |

(r) Specific Heat of Gases
Primary Economizer .2575 BTU/lb°F

TABLE II.

CALCULATIONS

Heat input (total of heat from feed water and gases) equals heat absorbed (total of heat in low pressure steam and in water passed to secondary economizer).

| | | |
|---|---|---|
| $Q_{L-120}$ Total heat at 120 degrees F going to primary economizer | equals | lbs/hr of high pressure steam (28,100 lbs/hr) plus lbs/hr of low pressure steam (unknown) times heat of liquid at 120° F (87.9 BTU/hr) |
| $Q_g$ Total heat absorbed by economizer | equals | lbs./hr of gases entering at 470° F and leaving at 310°F (320,000 lbs/hr) times specific heat of gases through primary economizer (.2575) BTU/lb. degrees F) |
| $Q_{LPST}$ Heat content of low pressure steam leaving deaerator | equals | lbs/hr of low pressure steam (unknown) times heat of vaporization of low pressure (80 psia) steam from deaerator 1183.1 BTU/lb) |
| $Q_{HPL}$ Heat content of water leaving deaerator | equals | lbs/hr of high pressure steam (28,100 lbs/hr) times heat of liquid at 80 psia (282 BTU/hr) |

From the foregoing the quantity of low pressures steam (7,035 lbs/hr) and the total water flow to the primary economizer (35,135 lbs/hr) can be determined from:

$$Q_{L\text{-}120} + Q_g = Q_{LPST} + Q_{HPL}$$

An examination of Tables I and II demonstrate typically how the process of the present invention performs where the actual heat absorption performance of 13,180,000 BTU per hr is attained in the primary economizer by utilizing the economizer structure and design established by Q=U A MTD where Q = 13,180,000 BTU/hr (Heat absorbed)
U = 8.4 BTU/hr/sq. ft/°F (overall heat transfer coefficient)
A = 10,750 sq. ft. (heating surface)
MTD = 146° F (log mean temperature difference)

While there has been shown and described a particular embodiment of heat recovery system according to the present invention, it is to be understood that changes in the heat exchange fluid, the shape and arrangement of specific components and other additions and omissions may be made by those skilled in the art without departing from the spirit and scope of the invention as described herein. The invention is defined in the following claims.

I claim:

1. A process for recovering waste heat from flue gases and the like, which comprises the steps of serially introducing gases containing waste heat into a first heat exchanger for first heat exchanging relationship with a fluid, maintaining said fluid at a pressure sufficient to provide a saturation temperature at the equilibrium temperature of the first heat exchanger and then introducing the output of the first heat exchanger into a vapor generator deaerator designed to remove vapor and air from the fluid at a pressure lower than the pressure of the first heat exchanger, subsequently collecting said fluid and then passing said collected fluid into a second heat exchanger for exchanging heat with gases containing waste heat at a temperature higher than the temperature of the first heat exchanger and introducing the output of the second heat exchanger into a fluid evaporator.

2. The process of claim 1 wherein the heat exchange fluid is a liquid maintained under a constant pressure and saturation temperature so that upon introduction of the vapor-liquid mixture into a vessel maintained at a lower pressure than said constant pressure useful vapor is generated for subsequent work.

3. Th process of claim 2 where in the heat exchange fluid is water.

4. The process of claim 3 wherein the saturation temperature of the fluid is less than about 400° F.

5. The process of claim 3 wherein the constant pressure is about 200 pounds per square inch absolute.

6. The process of claim 5 wherein the water is subsequently introduced into a high pressure boiler.

7. The process of claim 5 wherein the air entrapped in the heat exchange fluid is removed and ejected from the fluid vapor circuit.

8. The heat recovery process of claim 2 wherein the low pressure vapor recovered from the deaerator is utilized by the low pressure stages of a vapor turbine.

9. The heat recovery process of claim 1 wherein the gases containing waste heat are rich in corrosive condensable materials.

10. An apparatus for heat recovery comprising in combination a plurality of heat exchanges for providing for heat exchanging relationship between gases containing waste heat and a fluid for recovering said waste heat, a first of said heat exchangers communicating with a flashing vapor generator deaerator through pressure regulating means, and at least a second of said heat exchanges being predominately supplied with fluid from the discharge of fluid from said flashing vapor generator deaerator.

* * * * *